(12) United States Patent
Melcher et al.

(10) Patent No.: US 11,132,519 B1
(45) Date of Patent: Sep. 28, 2021

(54) VIRTUAL ASSET TAGGING AND AUGMENTED CAMERA DISPLAY SYSTEM AND METHOD OF USE

(71) Applicants: Michael Melcher, Honolulu, HI (US); Peter J. Melcher, Ithaca, NY (US); Kyle Bateman, Frisco, TX (US)

(72) Inventors: Michael Melcher, Honolulu, HI (US); Peter J. Melcher, Ithaca, NY (US); Kyle Bateman, Frisco, TX (US)

( * ) Notice: Subject to any disclaimer, the term of this patent is extended or adjusted under 35 U.S.C. 154(b) by 0 days.

(21) Appl. No.: 16/288,570

(22) Filed: Feb. 28, 2019

Related U.S. Application Data (60) Provisional application No. 62/636,912, filed on Mar. 1, 2018.

(51) Int. Cl.
| | |
|---|---|
| *G06K 7/10* | (2006.01) |
| *G06K 7/14* | (2006.01) |
| *G06K 19/06* | (2006.01) |
| *G06K 9/00* | (2006.01) |
| *G06F 3/0488* | (2013.01) |
| *H04N 5/232* | (2006.01) |

(52) U.S. Cl.
CPC ....... *G06K 7/10722* (2013.01); *G06F 3/0488* (2013.01); *G06K 7/1413* (2013.01); *G06K 19/06028* (2013.01); *G06K 9/00671* (2013.01); *H04N 5/23293* (2013.01)

(58) Field of Classification Search
CPC ... G06K 7/10722; G06K 7/10772; G06K 7/14
USPC .... 235/462.41, 462.01, 462.11, 462.24, 375, 235/487
See application file for complete search history.

(56) References Cited

U.S. PATENT DOCUMENTS

| | | | | |
|---|---|---|---|---|
| 9,645,394 B2* | 5/2017 | Kinnebrew | ........... | G06T 19/006 |
| 2010/0313146 A1* | 12/2010 | Nielsen | ................ | G06T 19/006 |
| | | | | 715/757 |
| 2011/0279478 A1* | 11/2011 | Bitra | ....................... | G06F 16/29 |
| | | | | 345/633 |
| 2012/0190455 A1* | 7/2012 | Briggs | .................... | H04L 67/38 |
| | | | | 463/42 |
| 2013/0218721 A1* | 8/2013 | Borhan | ................ | G06Q 20/322 |
| | | | | 705/26.41 |
| 2013/0264383 A1* | 10/2013 | Ko | ..................... | G05B 19/0426 |
| | | | | 235/375 |
| 2013/0281206 A1* | 10/2013 | Lyons | ................. | G07F 17/3211 |
| | | | | 463/33 |

(Continued)

*Primary Examiner* — Edwyn Labaze
(74) *Attorney, Agent, or Firm* — Leavitt Eldredge Law Firm (57) ABSTRACT

An asset tagging and monitoring system includes a smart device having a camera, a GPS, and a touch screen display; a server to communicate with the smart device to receive and store data; a tagging platform accessible from the smart device and to communicate with the camera, the mobile platform provides activating the camera to provide a visual representation of an area on the touch screen display; receiving user input to designate a first asset present within the area; creating a virtual asset tag associated with the first asset, the virtual asset tag having data associated therewith; assigning a position to the virtual asset tag, the position determined via the smart device; and creating an augmented display from the camera, the augmented display having a virtual asset tags displayed thereon, each of the virtual asset tags being associated with a tangible or intangible asset.

8 Claims, 10 Drawing Sheets

(56) References Cited

U.S. PATENT DOCUMENTS

| | | | |
|---|---|---|---|
| 2014/0126769 A1* | 5/2014 | Reitmayr | G06T 7/73 |
| | | | 382/103 |
| 2014/0148196 A1* | 5/2014 | Bassan-Eskenazi | ......... |
| | | | H04W 4/029 |
| | | | 455/456.1 |
| 2014/0248950 A1* | 9/2014 | Tosas Bautista | G06F 1/1694 |
| | | | 463/31 |
| 2015/0134552 A1* | 5/2015 | Engels | G06Q 10/087 |
| | | | 705/318 |
| 2015/0170064 A1* | 6/2015 | Zehler | G06Q 10/06 |
| | | | 235/375 |
| 2016/0109954 A1* | 4/2016 | Harris | G06F 3/017 |
| | | | 345/156 |
| 2018/0232937 A1* | 8/2018 | Moyer | A63F 13/65 |
| 2019/0197789 A1* | 6/2019 | Macauley | G11B 27/00 |
| 2019/0317974 A1* | 10/2019 | Chamberlin | G06F 16/434 |

\* cited by examiner

VIRTUAL ASSET TAGGING AND AUGMENTED CAMERA DISPLAY SYSTEM AND METHOD OF USE

BACKGROUND

1. Field of the Invention

The present invention relates generally to asset tagging systems for identifying and tracking one or more assets, and more specifically, to a system for virtual asset tagging and monitoring to provide a database of a plurality of assets including relevant and helpful data related to each of the plurality of assets and further including a notary/consent plug-in incorporated therein, as well as the ability to validate and track asset ownership.

2. Description of Related Art

Figure 1:
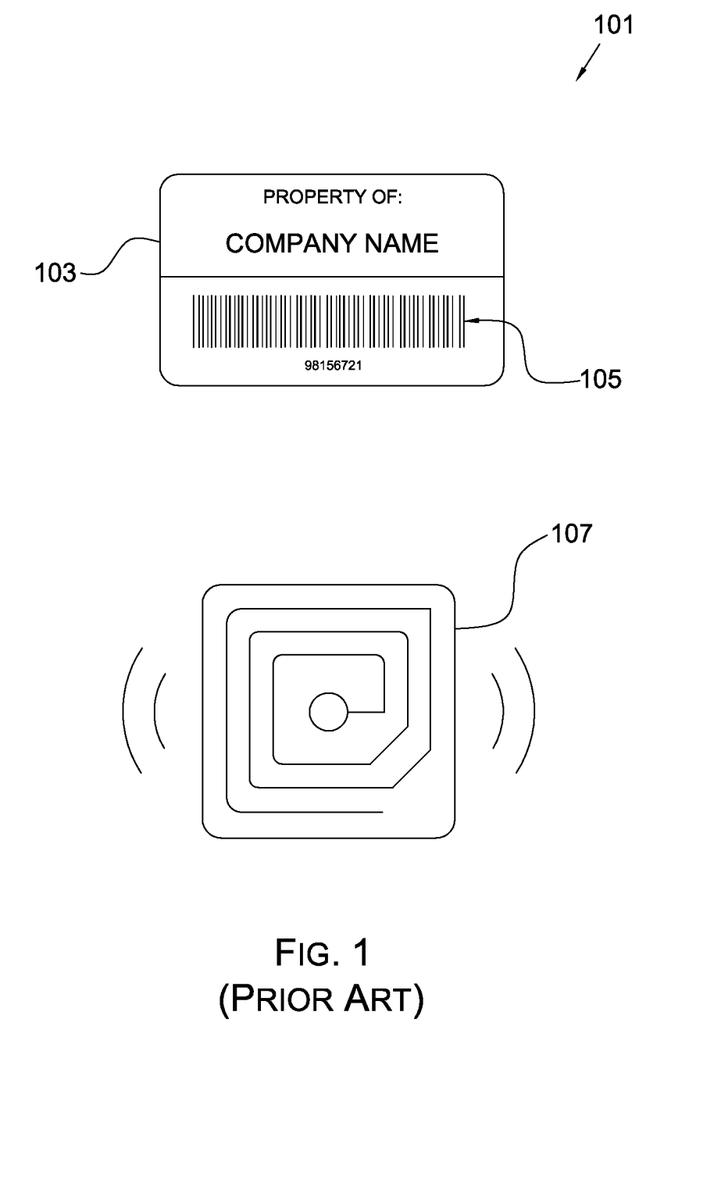
FIG. 1 is a front view of a system having two common styles of asset tags.

Asset tagging are well known in the art and are effective means to identify and track assets. For example, FIG. 1 depicts a system 101 of two conventional asset tags 103, 105. Tag 103 is a conventional adhesive style asset tag having a barcode 105 configured to be scanned by a device, wherein the barcode is associated with data related to the asset, such as a serial number, ownership data, and the like. Similarly, tag 107 is a conventional RFID tag configured to wirelessly communicate with one or more scanners to provide data to a server, wherein the data can include asset information such as a serial number, and ownership data. Further, tag 107 can provide location data to a server for additional monitoring.

One of the problems commonly associated with system 101 is limited uses. For example, tag 105 merely provides information once scanned to a computing device, thereby forcing a user to physically scan the barcode to retrieve such information. Further, tag 107 requires extensive infrastructure of scanners to accurate and effectively transmit data to a server.

Accordingly, although great strides have been made in the area of asset tagging systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional asset tagging systems. Specifically, the present invention provides a means to virtually tag a plurality of assets, wherein data is input and collected regarding each of the plurality of assets. The data includes, among other things, a location of the asset as determined by a smart device having a GPS unit incorporated therein. Further, the present inventing provides a means to tag non-tangible assets, such as tasks, thereby providing for improved scheduling and organization among persons and companies. In addition, the present invention requires no additional infrastructure, such as sensors. The system further provides an augmented display from a smart device camera to provide a visual representation of positions of assets tagged. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIGS. 2-6 depict various views of elements of a virtual asset tagging system 201 in accordance with a preferred embodiment of the present application. It will be appreciated that system 201 overcomes one or more of the above-listed problems commonly associated with conventional asset tagging systems.

Figure 2:
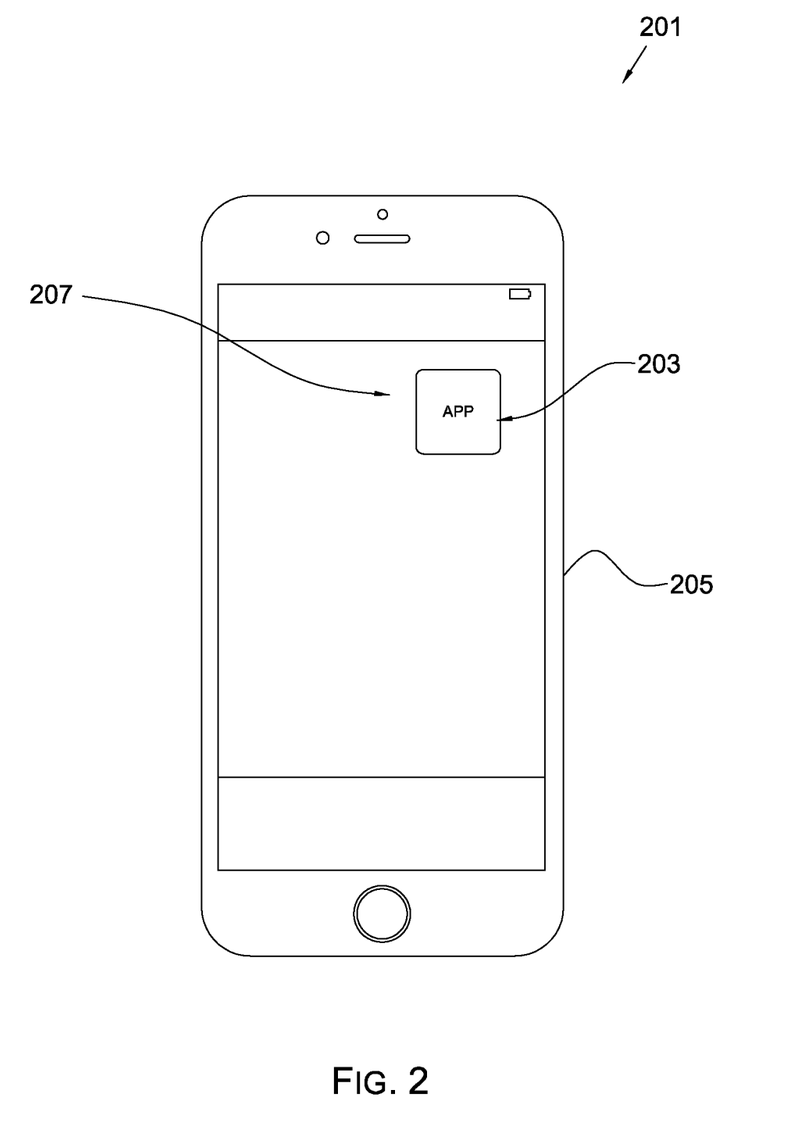
FIG. 2 is a simplified front view of a smart device of a virtual asset tagging system in accordance with a preferred embodiment of the present application.
Figure 3:
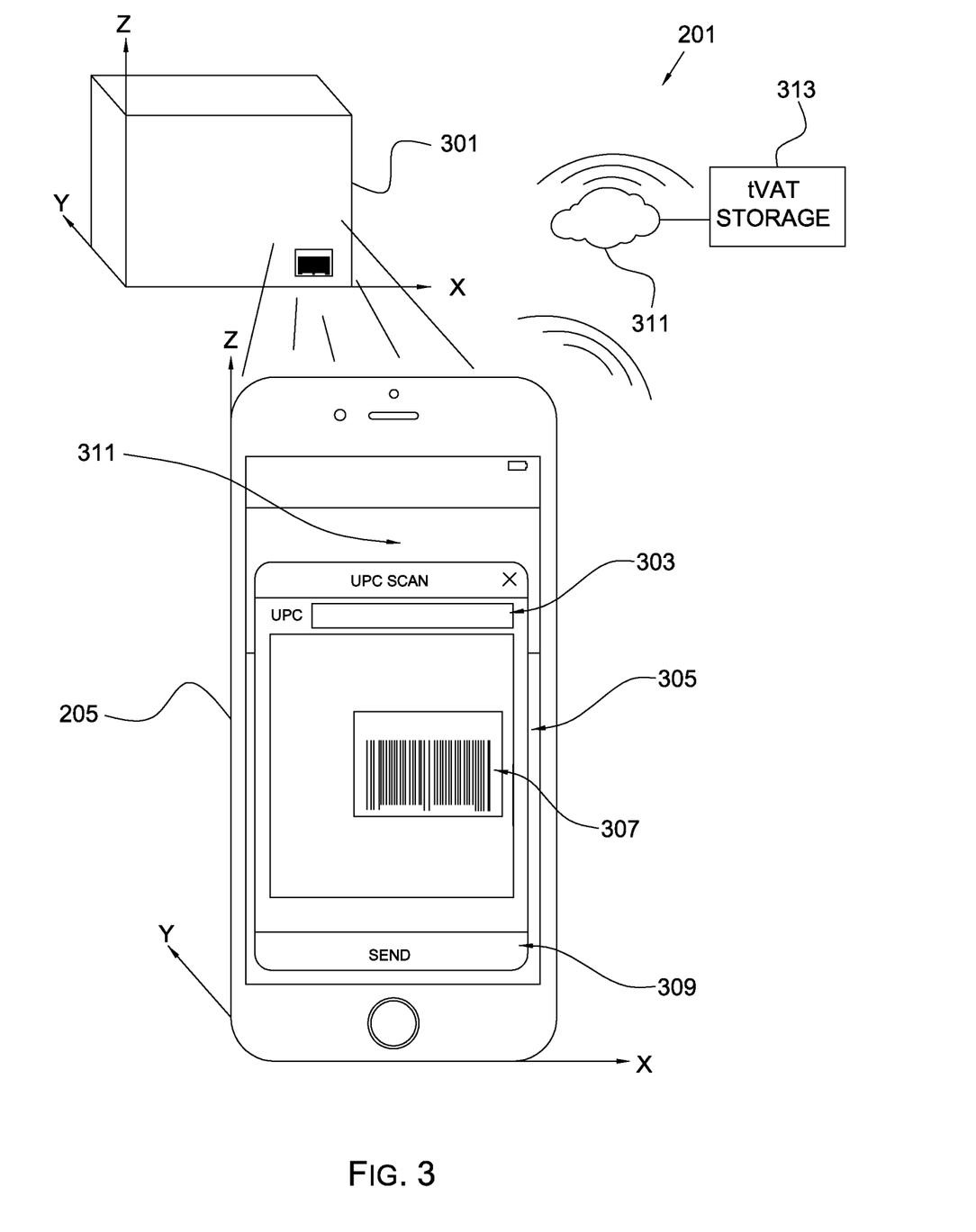
FIG. 3 is a schematic of virtual asset tagging system in accordance with a preferred embodiment of the present application.

In the contemplated embodiment, system 201 includes a platform 203 accessible via a smart device 205, such as a mobile phone, tablet, portable computer, and the like. The smart device 205 includes at least a location determination technology, a camera, and a display 207. In the preferred embodiment, the display 207 is a touch screen, and can include other input/output devices configured to receive information, such as hand gestors used with the MS Hololens, to be manipulated by the user.

Platform 203 provides a means to virtually tag a plurality of assets 301, including tangible assets such as furniture, equipment, purchased products, and the like, as well as intangible assets, such as a schedule, a task, intellectual property, human capital, company goodwill, or the like to be shared among coworkers, peers, friends, and/or family. During use, platform 203 connects to the camera of the smart device 205, to pull up a screen 311, wherein the user can virtually tag asset 301 via a tag screen 305. Platform 203 determines the XYZ coordinates of the asset based on the determined location of device 205. The precise location is determined based on the mobile device's GPS, compass, accelerometer, and camera screen.

The screen 311 allows the user to input identifying information associated with the asset, including, but not limited to, a bar code 307 and a UPC 303, however, in some embodiments, the platform can merely assign a unique ID to the asset. In this example, the asset is thereby identified and assigned a location, thereby providing a means for the user to retrieve the information at a later date. It should be appreciated that various means of tagging asset 301 and collecting data associated with asset 301 are contemplated (as discussed below in FIG. 7).

Figure 8:
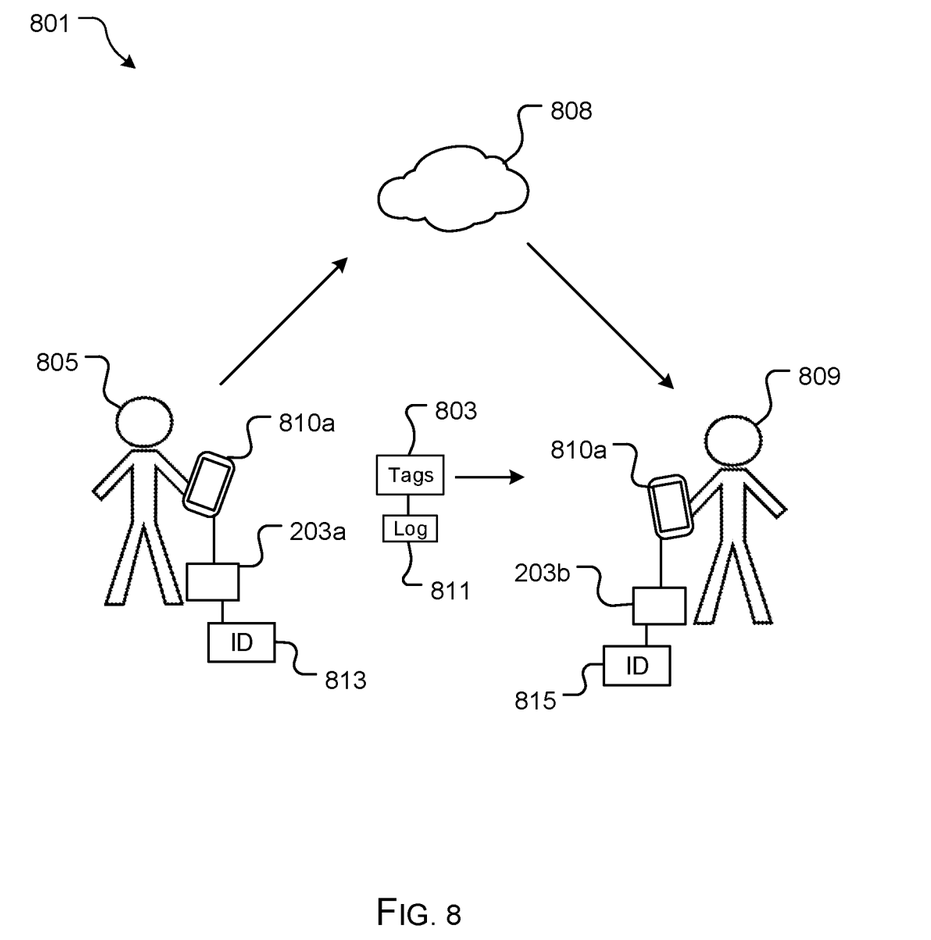
FIG. 8 is a schematic of a sharing method of the system of the present application.

In some embodiments, the user is provided with an option to send/share 309 the information to additional users (as will further be described in FIG. 8). System 201 further includes a server 311 configured to collect and store data 313 associated with a plurality of asset tags. In some embodiments, communication and data transfer between various computing devices and the network is achieved via Near Field Communication (NFC) and/or through the use of General Packet Radio Service (GPRS), however, other systems, such as Saas (Software as a service) could be used.

Figure 4:
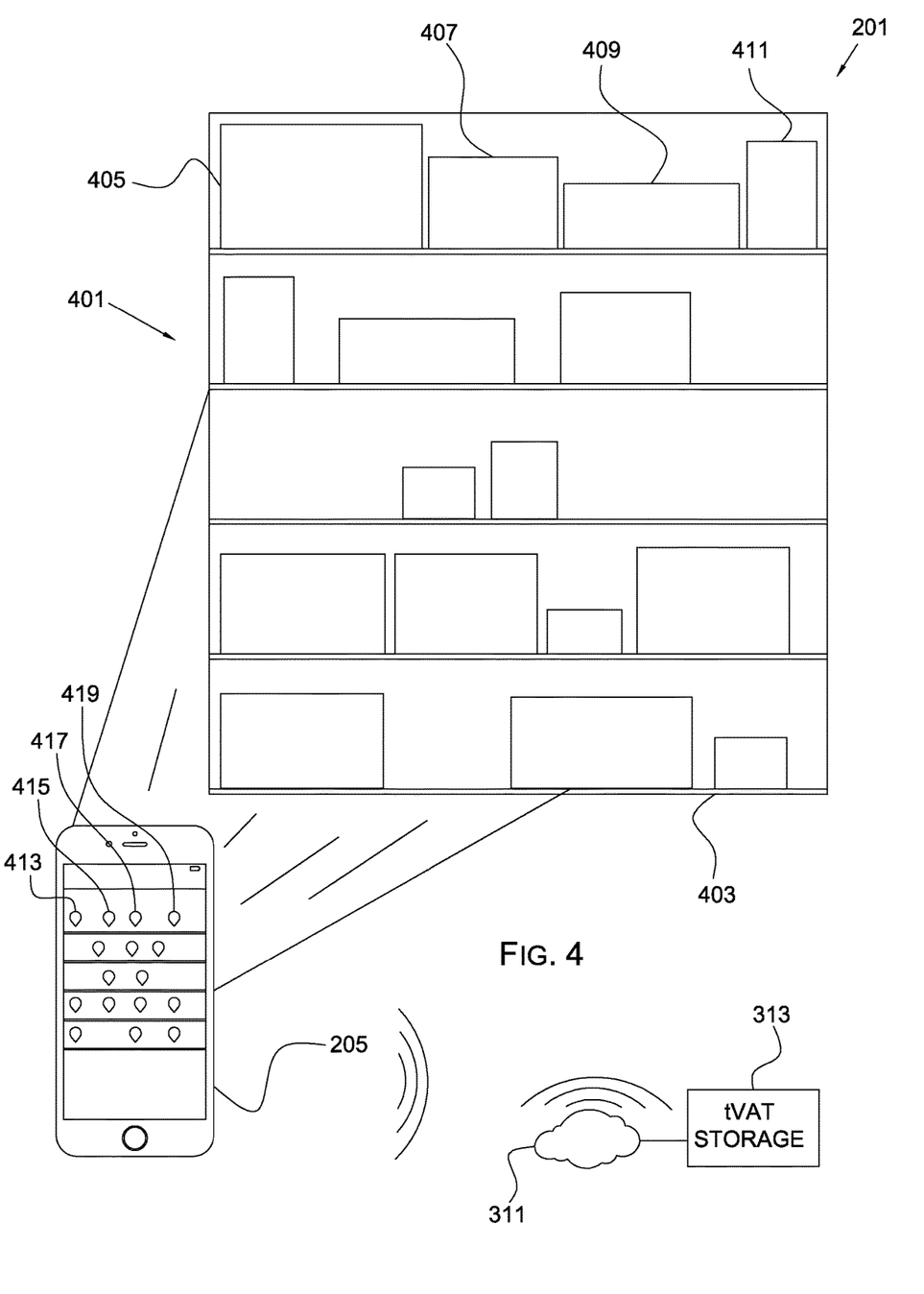
FIG. 4 is a schematic of a display associated with the virtual asset tagging system of FIG. 3.

As shown in FIG. 4, after tagging a plurality of assets 405, 407, 409, 411, within a geographical area 403 through platform 203, the platform 203 further provides a connection to the camera of device 205, wherein a display is created on device 205 showing the position of the plurality of assets, via a plurality of tags/tag symbols 413, 415, 417, 419. It should be understood that the platform augments the camera's reality by showing the tags being associated with positions of the assets relative to the smart device. As the user moves the smart device around, the positioning of the tags on the screen will move to reflect the correct positioning.

It should be appreciated that the user can further interact with the display via touch screen commands. The user can freeze the display, zoom in/out of the display, select tags, make updates, and the like.

It should be appreciated that one of the unique features believed characteristic of the present application is the use of a smart device with a camera to provide an augmented display, wherein positions of a plurality of assets are displayed based on prior virtual tagging of the plurality of assets. It must be understood that the assets are not limited to physical assets, but can include assets such as a schedule tag.

Figure 5:
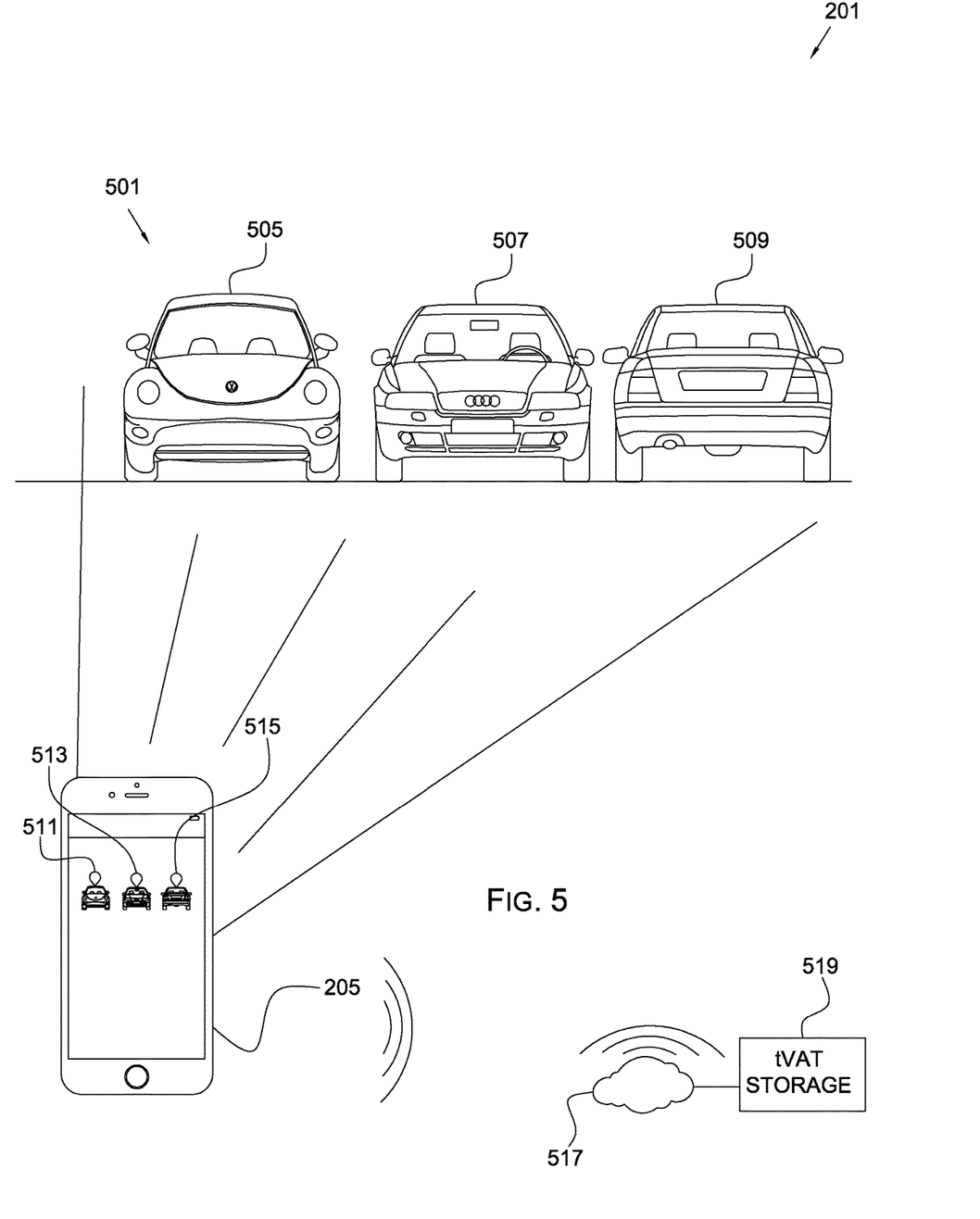
FIG. 5 is a schematic of a method of asset management associated with the virtual asset tagging system of FIG. 3.

In FIG. 5, one contemplated use 501 of system 201 is shown, wherein the assets are shown as a plurality of vehicles 505, 507, 509, each being tagged 511, 513, 515 and presented on device 205. It should be appreciated that in this use, data is initially input regarding the plurality of vehicles, the data can include location, ownership, make, model, and the like, each asset further having a unique ID associated therewith. The user can retrieve this information via device 205, and platform 203. In this embodiment, tags 511, 513, 515 are configured to track depreciation of vehicles 505, 507, 509, to provide the user with accurate value information about the vehicles.

Figure 6A:
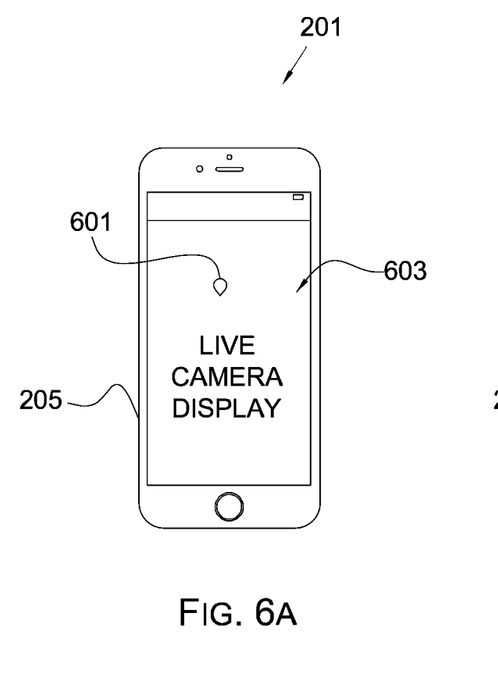
FIGS. 6A and 6B are schematics of data associated with a virtual asset tag of the system of FIG. 3.
Figure 6B:
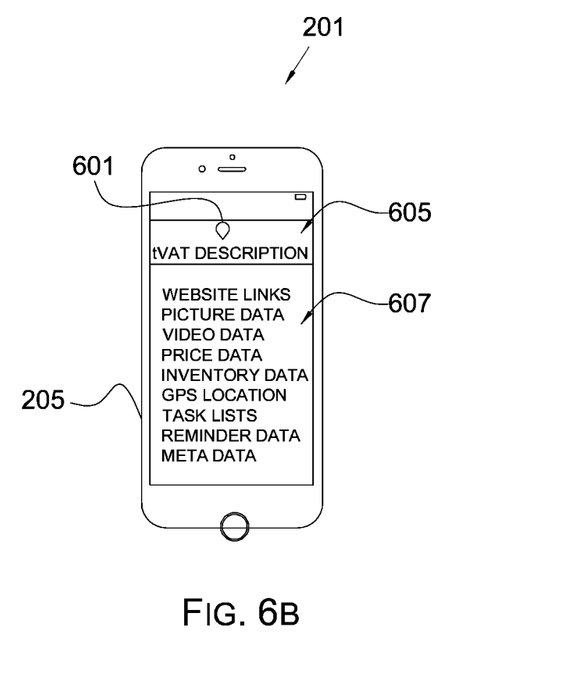

In FIGS. 6A and 6B, schematics of the initial tagging through platform 203 and device 205 is shown. During the initial tagging of each of the plurality of assets, the platform accesses the camera display 603, wherein the user uses the touch screen to tag 601 an asset to be saved and recorded. The user can then assign a description 605, and provide additional data 607, which can be prefilled by A/I such as Google Vision API and similar technologies, the data including, but not limited to, website links, picture data, video data, price data, inventory data, GPS location, tasks lists, reminder data, ownership data, audio recordings, meta data, and the like. It must be understood that the system allows for a unique collection of data by the user.

Figure 7:
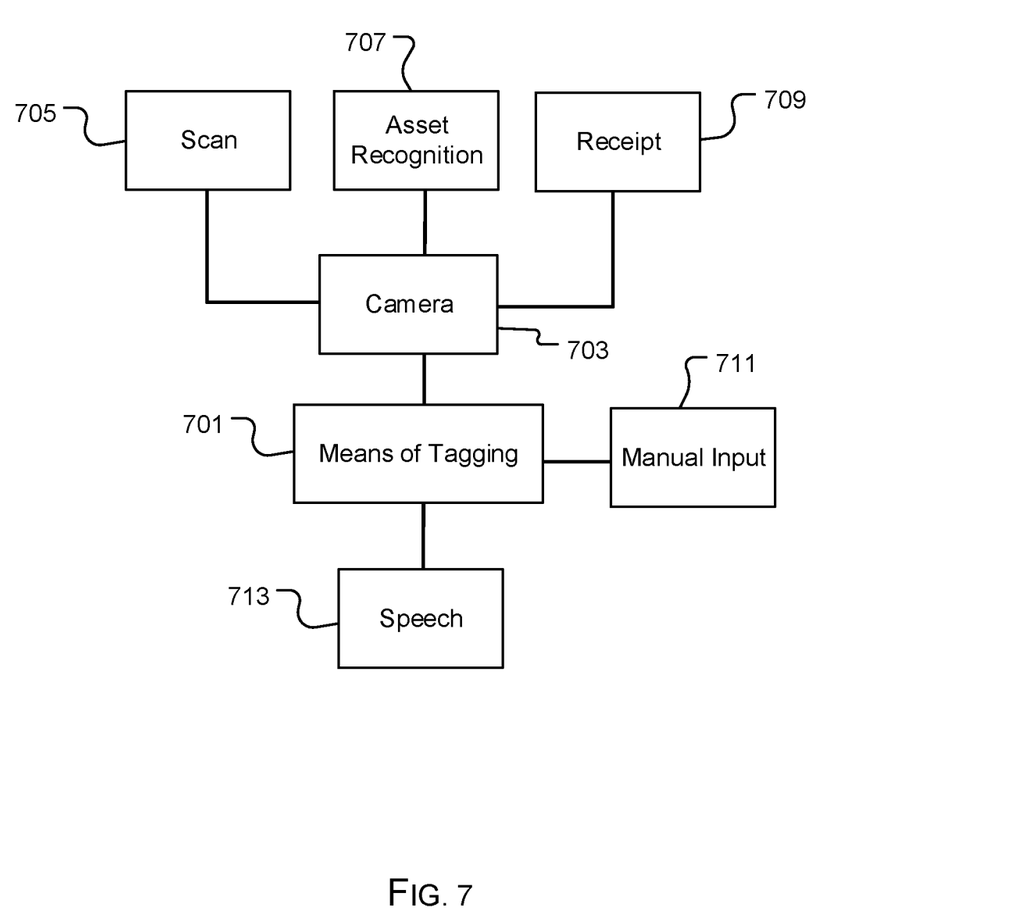
FIG. 7 is a schematic of a plurality of methods of virtual asset tagging in accordance with the present application.

In FIG. 7, a schematic of a plurality of means 701 of tagging and collecting data for the plurality of tags is further shown for clarity. The user can begin the creation of a tag through use of a camera 703 associated with the electronic device, such as smart phone or computer. The camera 703 can be configured to scan 705 a barcode or other code to retrieve data and information associated with the asset to be saved in the database and associated with the unique ID of the asset. In addition, the camera 703 can include asset recognition technology 707, wherein technology 707 recognizes the image within the camera and retrieves data associated therewith. Camera 703 can further be used to retrieve data from a receipt 709. Additional means of creating tags include manual input 711 by the user and voice/speech recording input 713.

In FIG. 8, a simplified schematic depicts a means 801 of sharing one or more virtual asset tags 803 in accordance with the present application. It should be appreciated that after one or more asset tags are created and stored, a first user 805 can proceed to share 807 the tag, virtually via a network 808, with a second user 809, via computing devices 810a-b. In the preferred embodiment, a record and/or log 811 of the sharing of the tag 803 is recorded based on identification 813, 815 of each user, this can be achieved via a position of access using GPS data. It should be appreciated that each user of the platform 203a-b will be assigned identification 813, 815, which can be correlated to their signature, a pin number, a fingerprint, and/or facial recognition, thereby providing a means to track sharing of the asset tag. It must further be understood that the sharing of the asset tag can be temporary, such as when a piece of equipment is loaned, or alternatively, can be permanent. In addition, the sharing can provide a means to track work, such as for a task tag.

Figure 9:
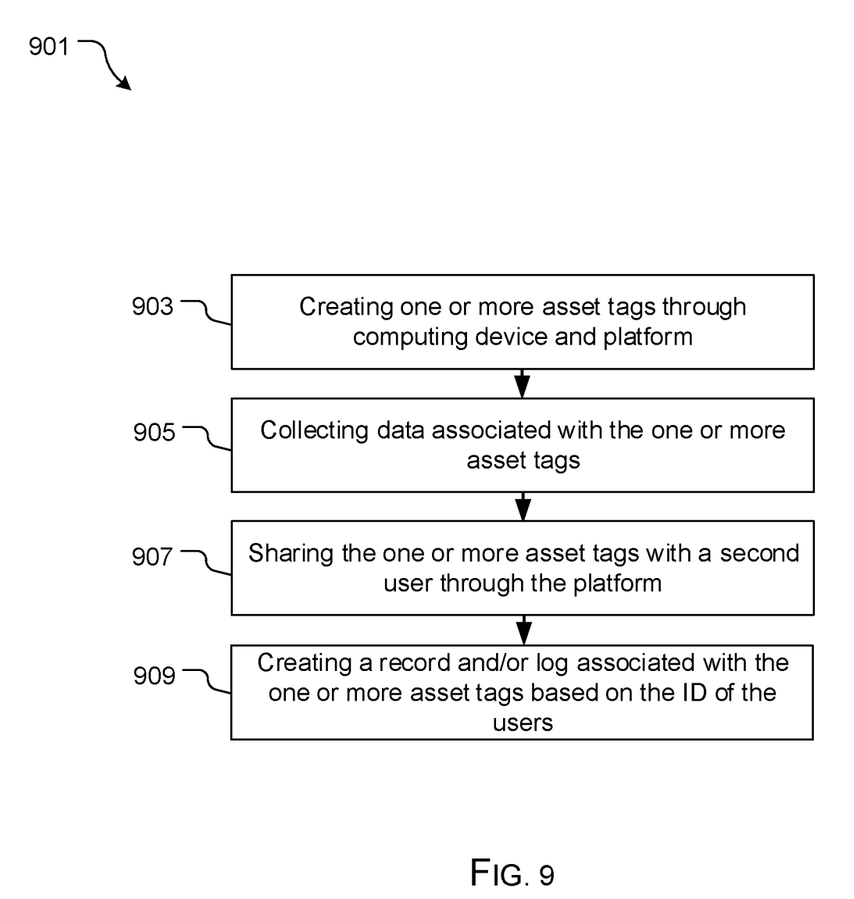
FIG. 9 is a flowchart of a method of sharing associated with the system of the present application.

In FIG. 9, a flowchart 901 further depicts a method of creating and sharing one or more asset tags. The one or more asset tags are created through the platform and mobile computing device through one or more of the means of tagging, as shown with box 903. Data is assigned to each of the asset tags through any of the means previously discussed, as shown with box 905. If the user decides to share one or more tags, they designate a recipient through the platform, wherein the asset tag is then transferred, on a permanent or tempera basis, as shown with box 907. A record/log associated with the sharing of the asset tag is recorded, as shown with box 909.

Figure 10:
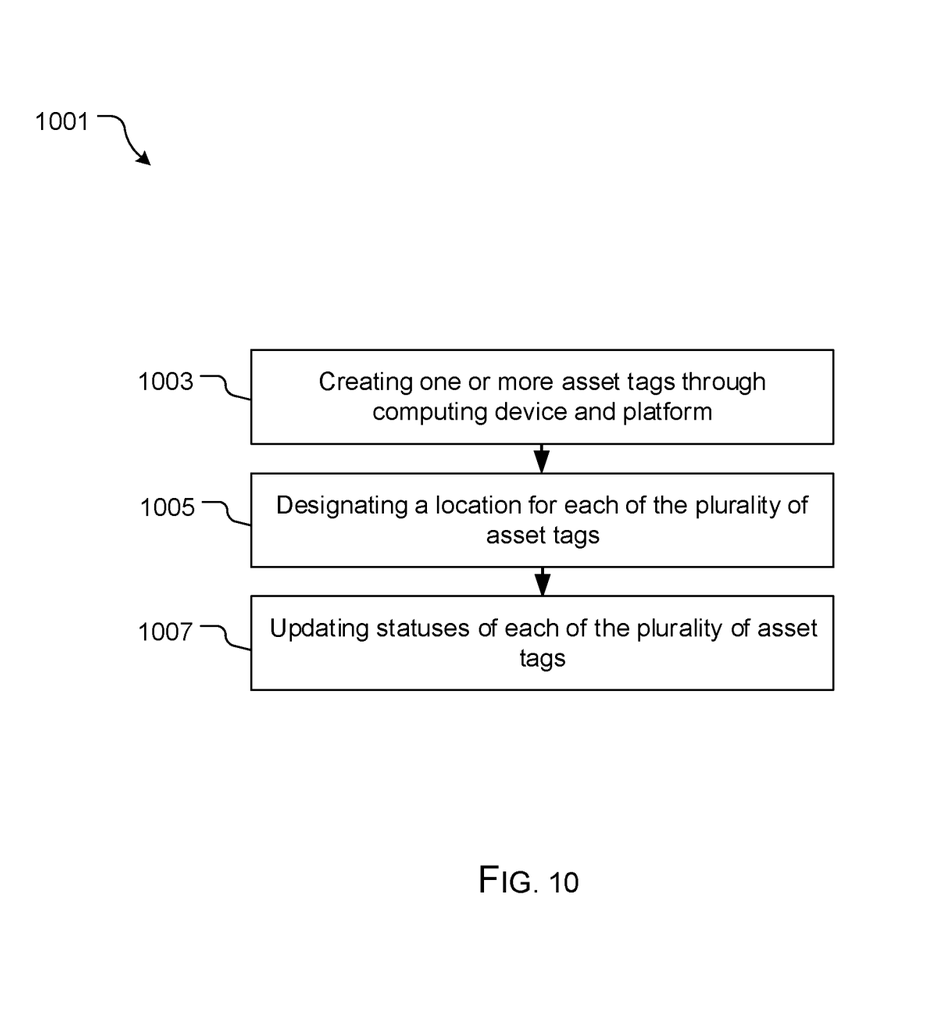
FIG. 10 is a flowchart of a method of asset environment management in accordance with the present application.

In FIG. 10, another flowchart 1001 depicts another method of asset environment management in accordance with the present application. During use, a user and or company creates one or more tags associated with their one or more assets, each tag having designated data and an assigned location, as shown with boxes 1003, 1005. The location can be designated appropriately for the asset environment management. As the asset is moved or changes status according to the user or company, the data of the tag is updated accordingly, as shown with box 1007. It should be appreciated that this method allows for a company to keep track of inventory, location of assets, depreciation of assets and the like. This method is appropriate for use with at least the following locations, including warehouses, office spaces, manufacturing plants, retail locations, transportation locations, personal locations (homes); and remote locations (storage facilities).

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. An asset tagging and monitoring system within a geographical area, comprising:
   a smart device having a camera, a GPS, a compass, an accelerometer, and a touch screen display;
   a server configured to communicate with the smart device to receive and store data;
   a plurality of assets, each of the plurality of assets being a physical asset, a first asset of the plurality of assets being within the geographical area;
   a plurality of virtual tags, each of the plurality of virtual tags being a visual indicator of a position of one of the plurality of assets;
   a mobile platform accessible from the smart device and configured to communicate with the camera, wherein the mobile platform provides:
      activating the camera when the smart device is within a proximity to the first asset within the geographical area to provide a visual representation of the geographical area and the first asset on the touch screen display;
      receiving user input to designate the first asset present within the geographical area;
      creating a virtual asset tag associated with the first asset, the virtual asset tag having data relating to the first asset associated therewith, the virtual asset tag being virtually tied to the first asset;
      assigning a position to the virtual asset tag, the position being a first position within the geographical area of the first asset and determined via the GPS, the compass, and the accelerometer of the smart device;
      creating an augmented display from the camera, the augmented display having the plurality of virtual asset tags displayed within the augmented display, the augmented display is configured to display the plurality of assets relative to each other in augmented reality;
      displaying on the augmented display the geographical area and a position of each of the plurality of virtual asset tags relative to each other;
      allowing the user to retrieve the data relating to the first asset through the touch screen and interaction with the virtual asset tag, the retrieving of the data being conducted at a location different from the geographical area;
      manipulating the data relating to the first asset at the location different from the geographical area; and
      sharing one or more of the plurality of virtual asset tags to other users, wherein the sharing creates an ownership log associated with the one or more virtual asset tags.

2. The system of claim 1, wherein the data includes one or more of:
   a unique identifier associated with the first asset;
   a picture;
   a video;
   a value of the first asset; and
   the ownership log containing ownership tracking data as determined via ownership authentication.

3. The system of claim 1, wherein the data includes depreciation data associated with the first asset.

4. The system of claim 1, wherein the mobile platform further comprises:
   an identification portal configured to collect user identification data.

5. The system of claim 4, wherein the user identification data comprises one or more of:
   a pin code;
   a signature;
   a fingerprint;
   a facial recognition; and
   a position of access using GPS data.

6. The system of claim 1, wherein the data further comprises:
   a record, the record having data associated with ownership of the asset.

7. A method of tagging and monitoring a plurality of assets, the method comprising: accessing a tagging platform via a smart device, the tagging platform being connected to a camera of the smart device; activating the camera through the tagging platform to receive a visual representation of a geographical location; using a touch screen of the smart device to tag an asset, the asset being a physical asset, within the geographical location, the tagging platform determining a first position of the asset via a GPS, compass, and accelerometer of the smart device; assigning a position to a virtual asset tag correlating to the first position of the asset, the virtual asset tag being a visual indicator of a position of the asset; inputting data into the platform, the data associated with the asset, wherein the data is stored in a server; and opening an augmented camera display via the tagging platform; allowing the user to interact with the plurality of virtual asset tags through the touch screen, the interaction including retrieving the data of each of the plurality of virtual asset tags; manipulating the data of each of the plurality of virtual asset tags; and share each of the plurality of virtual asset tags to other users, wherein the sharing creates an ownership log associated with the virtual asset tag; wherein a plurality of virtual asset tag positions are displayed on the augmented camera display, each of the plurality of virtual asset tag positions being associated with one of a plurality of asset; and wherein the augmented display is configured to display the plurality of assets relative to each other, and sharing the virtual asset tag with a second user via the tagging platform; and creating a record of ownership associated with the sharing of the virtual asset tag, the record being connected to the virtual asset tag.

8. The method of claim 7, further comprising:
  managing a plurality of virtual asset tags through asset environment management, wherein activity associated with each of the virtual asset tags is tracked.

\* \* \* \* \*